(12) United States Patent
Choi et al.

(10) Patent No.: US 12,344,735 B2
(45) Date of Patent: Jul. 1, 2025

(54) THERMOPLASTIC RESIN COMPOSITION, METHOD OF PREPARING THE SAME, AND MOLDED ARTICLE MANUFACTURED USING THE SAME

(71) Applicant: LG CHEM, LTD., Seoul (KR)

(72) Inventors: Suk Jo Choi, Daejeon (KR); Hyun Jun Ryu, Daejeon (KR); Tae Hoon Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 715 days.

(21) Appl. No.: 17/774,231

(22) PCT Filed: Jul. 19, 2021

(86) PCT No.: PCT/KR2021/009238
§ 371 (c)(1),
(2) Date: May 4, 2022

(87) PCT Pub. No.: WO2022/059896
PCT Pub. Date: Mar. 24, 2022

(65) Prior Publication Data
US 2022/0348760 A1    Nov. 3, 2022

(30) Foreign Application Priority Data

Sep. 15, 2020  (KR) .................. 10-2020-0118528
Jul. 15, 2021  (KR) .................. 10-2021-0093004

(51) Int. Cl.
| C08L 51/00 | (2006.01) |
| C08F 120/14 | (2006.01) |
| C08F 212/08 | (2006.01) |
| C08F 220/14 | (2006.01) |
| C08F 220/44 | (2006.01) |

(52) U.S. Cl.
CPC .......... C08L 51/003 (2013.01); C08F 120/14 (2013.01); C08F 212/08 (2013.01); C08F 220/14 (2013.01); C08F 220/44 (2013.01); C08L 2205/025 (2013.01)

(58) Field of Classification Search
CPC ........ C08L 51/003; C08L 51/04; C08L 51/06; C08L 25/12; C08L 25/16; C08L 2205/025; C08L 2205/03; C08L 2205/035
See application file for complete search history.

(56) References Cited

U.S. PATENT DOCUMENTS

| 6,380,306 | B1 | 4/2002 | Ittemann et al. |
| 2003/0032747 | A1 | 2/2003 | Lee et al. |
| 2004/0254270 | A1 | 12/2004 | Harashina |
| 2008/0076859 | A1 | 3/2008 | Eipper et al. |
| 2012/0016068 | A1 | 1/2012 | Chung et al. |
| 2013/0281603 | A1 | 10/2013 | Jin et al. |
| 2014/0058015 | A1 | 2/2014 | Yamada et al. |
| 2014/0235749 | A1 | 8/2014 | Kim et al. |
| 2015/0005435 | A1 | 1/2015 | Park et al. |
| 2015/0011709 | A1 | 1/2015 | Ahn et al. |
| 2016/0002455 | A1 | 1/2016 | Chung et al. |
| 2016/0060446 | A1 | 3/2016 | Park et al. |
| 2016/0319122 | A1 | 11/2016 | Niessner et al. |
| 2018/0265690 | A1 | 9/2018 | Kim et al. |
| 2019/0382574 | A1 | 12/2019 | An et al. |
| 2021/0221996 | A1 | 7/2021 | Jo et al. |
| 2021/0230333 | A1* | 7/2021 | Jo ................... C08F 267/08 |
| 2021/0363282 | A1 | 11/2021 | Kim et al. |
| 2021/0395510 | A1 | 12/2021 | Shin et al. |
| 2022/0298347 | A1 | 9/2022 | Ryu et al. |

FOREIGN PATENT DOCUMENTS

| CN | 102329462 A | 1/2012 |
| CN | 103764700 A | 4/2014 |
| CN | 104066757 A | 9/2014 |
| CN | 109071912 A | 12/2018 |
| JP | 2006241283 A | 9/2006 |
| JP | 4220902 B2 | 2/2009 |

(Continued)

OTHER PUBLICATIONS

TW Office Action issued in corresponding TW application 110127862 dated Sep. 9, 2024 Note: KR 10-2020-004963 cited therein was cited in a prior filed SB08.
Extended European Search Report issued in corresponding European Patent Application No. 21869520.3, dated Nov. 28, 2022.
Second Office Action dated Oct. 23, 2023 from the JPO corresponding Japanese Patent Application No. 2022-529071.
International Search Report and Written Opinion issued in corresponding International Patent Application No. PCT/KR2021/009238, dated Oct. 25, 2021.

(Continued)

*Primary Examiner* — Christopher M Rodd
(74) *Attorney, Agent, or Firm* — Morgan, Lewis & Bockius LLP

(57) ABSTRACT

Disclosed are a thermoplastic resin composition, a method of preparing the same, and a molded article manufactured using the same. The thermoplastic resin composition includes 3 to 22% by weight of a graft copolymer (A-1) including an acrylate-based rubber having an average particle diameter of 200 to 400 nm, an aromatic vinyl compound, and a vinyl cyanide compound; 17 to 40% by weight of a graft copolymer (A-2) including an acrylate-based rubber having an average particle diameter of 50 to 199 nm, an aromatic vinyl compound, and a vinyl cyanide compound; 30 to 57% by weight of a copolymer (B) including a (meth)acrylic acid alkyl ester compound, an α-methyl styrene-based compound, and a vinyl cyanide compound; and 6 to 30% by weight of a polymethacrylate resin (C) (except for α-methyl styrene), wherein an average multi-axial impact strength is 22 J/mm or more.

14 Claims, No Drawings

(56) References Cited

FOREIGN PATENT DOCUMENTS

| | | | |
|---|---|---|---|
| JP | 2018507923 A | 3/2018 | |
| JP | 2019137751 A | 8/2019 | |
| JP | 2021-521308 A | 8/2021 | |
| JP | 2022503504 A | 1/2022 | |
| JP | 2022-550104 A | 11/2022 | |
| KR | 10-0417066 B1 | 2/2004 | |
| KR | 10-2008-0035214 A | 4/2008 | |
| KR | 10-2012-0078583 A | 7/2012 | |
| KR | 10-1192871 B1 | 10/2012 | |
| KR | 10-1211341 B1 | 12/2012 | |
| KR | 10-2014-0005510 A | 1/2014 | |
| KR | 10-2016-0101998 A | 8/2016 | |
| KR | 10-2018-0050596 A | 5/2018 | |
| KR | 10-2018-0068565 A | 6/2018 | |
| KR | 10-2019-0027115 A | 3/2019 | |
| KR | 10-2019-0064989 A | 6/2019 | |
| KR | 10-2019-0073323 A | 6/2019 | |
| KR | 10-2020-0049324 A | 5/2020 | |
| KR | 10-2020-0049623 A | 5/2020 | |
| KR | 10-2020-0101285 A | 8/2020 | |
| TW | 201930375 A | 8/2019 | |
| WO | WO2012147811 A1 | 7/2014 | |
| WO | 2019/190298 A1 | 10/2019 | |

OTHER PUBLICATIONS

First Office Action issued in corresponding Chinese Patent Application No. 202180006070.6, dated Feb. 11, 2023. Note: KR 10-2020-0049623 and KR 10-2020-0049324 cited therein were cited in a prior-filed SB08.

First Office Action issued in corresponding Japanese Patent Application No. 2022-529071, dated Jun. 5, 2023. (KR 10-2020-0049324 cited therein was listed in an earlier-filed SB08.).

\* cited by examiner

THERMOPLASTIC RESIN COMPOSITION, METHOD OF PREPARING THE SAME, AND MOLDED ARTICLE MANUFACTURED USING THE SAME

CROSS-REFERENCE TO RELATED APPLICATIONS

This application claims priority to Korean Patent Application No. 10-2020-0118528, filed on Sep. 15, 2020, and Korean Patent Application No. 10-2021-0093004, re-filed on Jul. 15, 2021, based on the priority of the above patent, in the Korean Intellectual Property Office, the disclosures of each of which are incorporated herein by reference.

TECHNICAL FIELD

The present invention relates to a thermoplastic resin composition, a method of preparing the same, and a molded article manufactured using the same. More particularly, the present invention relates to a thermoplastic resin composition that has excellent impact resistance, heat resistance and fluidity, specifically can be used to injection-mold large products due to high multi-axial impact strength and a low standard deviation of the multi-axial impact strength and can suppress the occurrence of goniochromism while realizing deep black to satisfy the appearance quality of an injection-molded product and automobile reliability evaluation; a method of preparing the thermoplastic resin composition; and a molded article manufactured using the same.

BACKGROUND ART

To use automobile exterior materials without painting, properties that can satisfy automobile reliability evaluation together with the excellent appearance quality of an injection-molded product are required. In particular, for application to radiator grills, resin flowability, and high level of heat resistance and impact strength are required to enable injection-molding of large products, and multi-axial impact strength characteristics related to major reliability evaluation are required. For this, it is necessary to mix an MMA-based resin for realizing deep black with a heat-resistant resin for realizing heat resistance. However, it is difficult to achieve the desired exterior quality of an injection-molded product and the uniform physical properties therein because the compatibility between the two resins is not good. When two resins with poor compatibility are mixed, goniochromism occurs and the deviation in properties increases. In particular, there is a problem in that the standard deviation value of multi-axial impact strength, which is a major reliability evaluation item for automobiles, increases.

Therefore, there is a need for the development of a thermoplastic resin composition that is capable of realizing deep black and injection-molding a large product while having heat resistance and impact resistance and improving the appearance quality of an injection-molded product.

RELATED ART DOCUMENT

Patent Document

Korean Patent No. 10-0417066

DISCLOSURE

Technical Problem

Therefore, the present invention has been made in view of the above problems, and it is one object of the present invention to provide a thermoplastic resin composition that has excellent impact resistance, heat resistance and fluidity, specifically can be used to injection-mold large products due to high average multi-axial impact strength and a low standard deviation of the multi-axial impact strength and can suppress the occurrence of goniochromism while realizing deep black to satisfy the appearance quality of an injection-molded product and automobile reliability evaluation; a method of preparing the thermoplastic resin composition; and a molded article manufactured using the same.

The above and other objects can be accomplished by the present invention described below.

Technical Solution

In accordance with an aspect of the present invention, the above and other objects can be accomplished by the provision of a thermoplastic resin composition, including: 3 to 22% by weight of a graft copolymer (A-1) including an acrylate-based rubber having an average particle diameter of 200 to 400 nm, an aromatic vinyl compound, and a vinyl cyanide compound; 17 to 40% by weight of a graft copolymer (A-2) including an acrylate-based rubber having an average particle diameter of 50 to 199 nm, an aromatic vinyl compound, and a vinyl cyanide compound; 30 to 57% by weight of a copolymer (B) including a (meth)acrylic acid alkyl ester compound, an α-methyl styrene-based compound, and a vinyl cyanide compound; and 6 to 30% by weight of a polymethacrylate resin (C) (except for α-methyl styrene), wherein an average multi-axial impact strength, which is obtained by measuring a maximum load energy 10 times at a speed of 4.4 m/s according to ISO 6603-2, of a specimen having a thickness of 2.0 mm is 22 J/mm or more, and a standard deviation thereof is 6.5 or less.

In accordance with another aspect of the present invention, there is provided a thermoplastic resin composition, including: 3 to 22% by weight of a graft copolymer (A-1) including an acrylate-based rubber having an average particle diameter of 200 to 400 nm, an aromatic vinyl compound, and a vinyl cyanide compound; 17 to 40% by weight of a graft copolymer (A-2) including an acrylate-based rubber having an average particle diameter of 50 to 199 nm, an aromatic vinyl compound, and a vinyl cyanide compound; 30 to 57% by weight of a copolymer (B) including a (meth)acrylic acid alkyl ester compound, an α-methyl styrene-based compound, and a vinyl cyanide compound; and 6 to 30% by weight of a polymethacrylate resin (C) (except for α-methyl styrene), wherein an average multi-axial impact strength, which is obtained by measuring a maximum load energy 10 times at a speed of 4.4 m/s according to ISO 6603-2, of a specimen having a thickness of 2.0 mm is 22 J/mm or more, a standard deviation thereof is 6.5 or less, and the copolymer (B) includes 30 to 55% by weight of a (meth)acrylic acid alkyl ester compound, 25 to 50% by weight of an α-methyl styrene-based compound, and 10 to 30% by weight of a vinyl cyanide compound.

In accordance with still another aspect of the present invention, there is provided a thermoplastic resin composition, including: 3 to 22% by weight of a graft copolymer (A-1) including an acrylate-based rubber having an average particle diameter of 200 to 400 nm, an aromatic vinyl compound, and a vinyl cyanide compound; 17 to 40% by weight of a graft copolymer (A-2) including an acrylate-based rubber having an average particle diameter of 50 to 199 nm, an aromatic vinyl compound, and a vinyl cyanide compound; 30 to 57% by weight of a copolymer (B) including a (meth)acrylic acid alkyl ester compound, an α-methyl styrene-based compound, and a vinyl cyanide compound; and 6 to 30% by weight of a polymethacrylate resin (C) (except for α-methyl styrene), wherein an average multi-axial impact strength, which is obtained by measuring a maximum load energy 10 times at a speed of 4.4 m/s according to ISO 6603-2, of a specimen having a thickness of 2.0 mm is 22 J/mm or more, a standard deviation thereof is 6.5 or less, and the polymethacrylate resin (C) (except for α-methyl styrene) includes 55% by weight or more of a methacrylate monomer.

In accordance with still another aspect of the present invention, there is provided a method of preparing a thermoplastic resin composition, the method including: a step of mixing 3 to 22% by weight of a graft copolymer (A-1) including an acrylate-based rubber having an average particle diameter of 200 to 400 nm, an aromatic vinyl compound, and a vinyl cyanide compound, 17 to 40% by weight of a graft copolymer (A-2) including an acrylate-based rubber having an average particle diameter of 50 to 199 nm, an aromatic vinyl compound, and a vinyl cyanide compound, 30 to 57% by weight of a copolymer (B) including a (meth)acrylic acid alkyl ester compound, an α-methyl styrene-based compound, and a vinyl cyanide compound, and 6 to 30% by weight of a polymethacrylate resin (C) (except for α-methyl styrene), and then preparing a thermoplastic resin composition at 200 to 300° C. using an extrusion kneader with a size of 10 to 100 pi, wherein an average multi-axial impact strength, which is obtained by measuring a maximum load energy 10 times using a specimen having a thickness of 2.0 mm at a speed of 4.4 m/s according to ISO 6603-2, of the prepared thermoplastic resin composition is 22 J/mm or more, and a standard deviation of the average multi-axial impact strength is 6.5 or less.

In accordance with still another aspect of the present invention, there is provided a method of preparing a thermoplastic resin composition, the method including: a step of mixing 3 to 22% by weight of a graft copolymer (A-1) including an acrylate-based rubber having an average particle diameter of 200 to 400 nm, an aromatic vinyl compound, and a vinyl cyanide compound, 17 to 40% by weight of a graft copolymer (A-2) including an acrylate-based rubber having an average particle diameter of 50 to 199 nm, an aromatic vinyl compound, and a vinyl cyanide compound, 30 to 57% by weight of a copolymer (B) including a (meth)acrylic acid alkyl ester compound, an α-methyl styrene-based compound, and a vinyl cyanide compound, and 6 to 30% by weight of a polymethacrylate resin (C) (except for α-methyl styrene), and then preparing a thermoplastic resin composition at 200 to 300° C. using an extrusion kneader with a size of 10 to 100 pi, wherein an average multi-axial impact strength, which is obtained by measuring a maximum load energy 10 times using a specimen having a thickness of 2.0 mm at a speed of 4.4 m/s according to ISO 6603-2, of the prepared thermoplastic resin composition is 22 J/mm or more, a standard deviation of the average multi-axial impact strength is 6.5 or less, and the copolymer (B) includes 30 to 55% by weight of a (meth)acrylic acid alkyl ester compound, 25 to 50% by weight of an α-methyl styrene-based compound, and 10 to 30% by weight of a vinyl cyanide compound.

In accordance with still another aspect of the present invention, there is provided a method of preparing a thermoplastic resin composition, the method including: a step of mixing 3 to 22% by weight of a graft copolymer (A-1) including an acrylate-based rubber having an average particle diameter of 200 to 400 nm, an aromatic vinyl compound, and a vinyl cyanide compound, 17 to 40% by weight of a graft copolymer (A-2) including an acrylate-based rubber having an average particle diameter of 50 to 199 nm, an aromatic vinyl compound, and a vinyl cyanide compound, 30 to 57% by weight of a copolymer (B) including a (meth)acrylic acid alkyl ester compound, an α-methyl styrene-based compound, and a vinyl cyanide compound, and 6 to 30% by weight of a polymethacrylate resin (C) (except for α-methyl styrene), and then preparing a thermoplastic resin composition at 200 to 300° C. using an extrusion kneader with a size of 10 to 100 pi, wherein an average multi-axial impact strength, which is obtained by measuring a maximum load energy 10 times using a specimen having a thickness of 2.0 mm at a speed of 4.4 m/s according to ISO 6603-2, of the prepared thermoplastic resin composition is 22 J/mm or more, a standard deviation of the average multi-axial impact strength is 6.5 or less, and the polymethacrylate resin (C) (except for α-methyl styrene) includes 55% by weight or more of a methacrylate monomer.

In accordance with yet another aspect of the present invention, there is provided a molded article including the thermoplastic resin composition.

Advantageous Effects

As apparent from the above description, the present invention provides a thermoplastic resin composition that has excellent impact resistance, heat resistance and fluidity, specifically can be used to injection-mold large products due to high average multi-axial impact strength and a low standard deviation of the multi-axial impact strength and can suppress the occurrence of goniochromism while realizing deep black to satisfy the appearance quality of an injection-molded product and automobile reliability evaluation; a method of preparing the thermoplastic resin composition; and a molded article manufactured using the same.

BEST MODE

Hereinafter, a thermoplastic resin composition of the present disclosure, a method of preparing the same, and a molded article manufactured using the same are described in detail.

The present inventors conducted studies to improve compatibility between a heat-resistant resin and an MMA-based resin. As a result, the present inventors confirmed that, when the contents of two kinds of ASA resins having different average particle diameters are adjected to predetermined contents and the contents of a copolymer, which includes a (meth)acrylic acid alkyl ester compound, an α-methyl styrene-based compound, and a vinyl cyanide compound, and a polymethacrylate resin (except for α-methyl styrene) are adjusted to predetermined contents, goniochromism does not occur, deep black may be realized, multi-axial impact strength is increased, and a standard deviation of multi-axial impact strength is reduced. Based on these results, the present inventors conducted further studies to complete the present invention.

The thermoplastic resin composition of the present invention includes 3 to 22% by weight of a graft copolymer (A-1) including an acrylate-based rubber having an average particle diameter of 200 to 400 nm, an aromatic vinyl compound, and a vinyl cyanide compound; 17 to 40% by weight of a graft copolymer (A-2) including an acrylate-based rubber having an average particle diameter of 50 to 199 nm, an aromatic vinyl compound, and a vinyl cyanide compound; 30 to 57% by weight of a copolymer (B) including a (meth)acrylic acid alkyl ester compound, an α-methyl styrene-based compound, and a vinyl cyanide compound; and 6 to 30% by weight of a polymethacrylate resin (C) (except for α-methyl styrene), wherein an average multi-axial impact strength, which is obtained by measuring a maximum load energy 10 times at a speed of 4.4 m/s according to ISO 6603-2, of a specimen having a thickness of 2.0 mm is 22 J/mm or more, and a standard deviation thereof is 6.5 or less. In this case, due to excellent impact resistance, heat resistance and fluidity, a large product can be injection-molded and deep black can be realized. Further, the occurrence of goniochromism is suppressed, thereby satisfying the appearance quality of an injection-molded product, and automobile reliability evaluation.

Hereinafter, each component of the thermoplastic resin composition of the present invention is described in detail.

A-1) Graft Copolymer Including Acrylate-Based Rubber Having Average Particle Diameter of 200 to 400 nm, Aromatic Vinyl Compound, and Vinyl Cyanide Compound The acrylate rubber of the graft copolymer may have, for example, average particle diameter of 200 to 400 nm, preferably 220 to 350 nm, more preferably 250 to 330 nm. Within these ranges, a finally produced thermoplastic resin composition may have excellent weather resistance, colorability, gloss, impact strength, and surface properties.

In this description, the average particle diameter may be measured by light scattering, and specifically, is measured as an intensity value using a particle size analyzer (trade name: Nicomp 380, manufacturer: PSS) in a Gaussian mode. As a specific measurement example, a sample may be prepared by diluting 0.1 g of latex (TSC: 35 to 50 wt %) 1,000 to 5,000-fold with deionized water or distilled water, i.e., by appropriately diluting not to significantly deviate an intensity setpoint of 300 kHz, and may be fed into a glass tube, and the average particle diameter may be measured using flow cells in an auto-dilution manner and in a mode of dynamic light scattering/intensity 300 kHz/intensity-weight Gaussian analysis. At this time, temperature may be set to 23° C., measurement wavelength may be set to 632.8 nm, and channel width may be set to 10 μsec.

The graft copolymer (A-1) may be included in an amount of, for example, 3 to 22% by weight, preferably 5 to 20% by weight, more preferably 7 to 15% by weight. Within these ranges, impact resistance, heat resistance, and fluidity are excellent, specifically an average multi-axial impact strength is high and a standard deviation of the average multi-axial impact strength is reduced, thereby being capable of injection-molding a large product. Further, deep black can be realized, and the occurrence of goniochromism is suppressed, thereby satisfying the appearance quality of an injection-molded product, and automobile reliability evaluation.

In this disclosure, goniochromism refers to a phenomenon wherein a rainbow or pearlescent color appears on pellets or injection specimens due to poor compatibility between resins. When the phenomenon is expressed, the colorability of a dye or a pigment is lowered, so that the color of the exterior of an injection-molded product becomes non-uniform, and the blackness level (L) increases compared to coloring with pigment or dye, which makes it difficult to express deep black.

The graft copolymer (A-1) may include, for example, 30 to 60% by weight of an acrylate-based rubber, 20 to 60% by weight of an aromatic vinyl compound, and 5 to 20% by weight of a vinyl cyanide compound. Within these ranges, impact resistance, multi-axial impact strength, and a standard deviation of the multi-axial impact strength are improved and the appearance quality of an injection-molded product are excellent.

As a preferred example, the graft copolymer (A-1) may include 35 to 55% by weight of an acrylate-based rubber, 35 to 55% by weight of an aromatic vinyl compound, and 7 to 17% by weight of a vinyl cyanide compound. Within these ranges, multi-axial impact strength and a standard deviation thereof are improved, and the appearance quality of an injection-molded product is excellent.

In this disclosure, a polymer including a certain compound means a polymer prepared by polymerizing the compound, and a unit in the polymer is derived from the compound.

The graft copolymer (A-1) may be prepared, for example, by emulsion polymerization. In this case, impact resistance, chemical resistance, weather resistance, and colorability are excellent.

Emulsion graft polymerization methods commonly practiced in the art to which the present invention pertains may be used as the emulsion polymerization method of the present invention without particular limitation.

For example, the acrylate of the present invention may include one or more selected from the group consisting of alkyl acrylates containing an alkyl group having 2 to 8 carbon atoms, and is preferably an alkyl acrylate containing an alkyl group having 4 to 8 carbon atoms, more preferably butyl acrylate or ethylhexyl acrylate.

For example, the aromatic vinyl compound of the present invention may include one or more selected from the group consisting of styrene, α-methyl styrene, o-methyl styrene, ρ-methyl styrene, m-methyl styrene, ethyl styrene, isobutyl styrene, t-butyl styrene, o-bromo styrene, ρ-bromo styrene, m-bromo styrene, o-chlorostyrene, ρ-chlorostyrene, m-chlorostyrene, vinyltoluene, vinylxylene, fluorostyrene and vinylnaphthalene, and is preferably styrene.

For example, the vinyl cyanide compound of the present invention may include one or more selected from the group consisting of acrylonitrile, methacrylonitrile, ethylacrylonitrile, and isopropylacrylonitrile, and is preferably acrylonitrile.

A-2) Graft Copolymer Including Acrylate-Based Rubber Having Average Particle Diameter of 50 to 199 nm, Aromatic Vinyl Compound, and Vinyl Cyanide Compound The acrylate rubber of the graft copolymer may have an average particle diameter of, for example, 50 to 199 nm, preferably 70 to 180 nm, more preferably 90 to 150 nm. Within these ranges, a finally produced thermoplastic resin composition has excellent weather resistance, colorability, gloss, impact strength, and surface properties.

The graft copolymer (A-2) may be included in an amount of, for example, 17 to 40% by weight, preferably 20 to 35% by weight, more preferably 25 to 30% by weight. Within these ranges, impact resistance, heat resistance, and fluidity are excellent and, specifically, an average multi-axial impact strength is high and a standard deviation thereof is reduced, thereby being capable of injection-molding a large product, and suppressing the occurrence of goniochromism while realizing deep black. Accordingly, the appearance quality of an injection-molded product and automobile reliability evaluation are satisfied.

The graft copolymer (A-2) may include, for example, 30 to 60% by weight of an acrylate-based rubber, 20 to 60% by weight of an aromatic vinyl compound, and 5 to 20% by weight of a vinyl cyanide compound. Within these ranges, deep black is excellently expressed, and a standard deviation of multi-axial impact strength is reduced, resulting in property stability.

As a preferred example, the graft copolymer (A-2) may include 35 to 55% by weight of an acrylate-based rubber, 35 to 55% by weight of an aromatic vinyl compound, and 7 to 17% by weight of a vinyl cyanide compound. Within these ranges, deep black is excellently expressed, and a standard deviation of multi-axial impact strength is reduced, resulting in property stability.

The graft copolymer (A-2) may be prepared, for example, by emulsion polymerization. In this case, impact resistance, chemical resistance, weather resistance, and colorability are excellent.

Emulsion polymerization commonly practiced in the art to which the present invention pertains may be used in the present invention without particular limitation.

The graft copolymer (A-1) may be included, for example, in an amount the same or smaller than that of the graft copolymer (A-2). Preferably, a weight ratio between the graft copolymer (A-1) and the graft copolymer (A-2) may be 1:1 to 1:7.5, more preferably 1:1 to 1:7, even more preferably 1:2 to 1:4, even more preferably 1:2 to 1:3. Within these ranges, multi-axial impact strength and a standard deviation thereof are improved, so that a large injection-molded article can be manufactured, and deep black can be realized.

In this disclosure, the weight ratio of A to B refers to the weight ratio of A:B.

B) Copolymer Including (Meth)acrylic Acid Alkyl Ester Compound, α-Methyl Styrene-Based Compound, and Vinyl Cyanide Compound The copolymer (B) may be included in an amount of, for example, 30 to 60% by weight, preferably 35 to 55% by weight, more preferably 42 to 54% by weight, even more preferably 45 to 50% by weight. Within these ranges, impact resistance, heat resistance, and fluidity are excellent, and specifically, an average multi-axial impact strength is excellent and a standard deviation of the average multi-axial impact strength is reduced, so that a large product can be injection-molded. In addition, the occurrence of goniochromism can be suppressed while realizing deep black, thereby satisfying the appearance quality of an injection-molded product and automobile reliability evaluation.

The copolymer (B) may include, for example, 30 to 55% by weight of a (meth)acrylic acid alkyl ester compound, 25 to 50% by weight of an α-methyl styrene-based compound, and 10 to 30% by weight of a vinyl cyanide compound. Within these ranges, compatibility with a polymethacrylate resin (C) (except for α-methyl styrene) described below is improved, so that goniochromism does not occur. Accordingly, the appearance quality of an injection-molded product is excellent.

The copolymer (B) may include preferably 35 to 50% by weight of a (meth)acrylic acid alkyl ester compound, 30 to 45% by weight of an α-methyl styrene-based compound, and 12 to 27% by weight of a vinyl cyanide compound. Within these ranges, compatibility with the polymethacrylate resin (C) (except for α-methyl styrene) described below is improved, so that goniochromism does not occur. Accordingly, the appearance of an injection-molded product is excellent.

The copolymer (B) may include more preferably 40 to 45% by weight of a (meth)acrylic acid alkyl ester compound, 35 to 40% by weight of an α-methyl styrene-based compound, and 17 to 22% by weight of a vinyl cyanide compound. Within these ranges, compatibility with the polymethacrylate resin (C) (except for α-methyl styrene) described below is improved, so that goniochromism does not occur. Accordingly, the appearance of an injection-molded product is excellent.

The weight-average molecular weight of the copolymer (B) may be, for example, 50,000 to 200,000 g/mol, preferably 70,000 to 150,000 g/mol, more preferably 80,000 to 120,000 g/mol. Within these ranges, multi-axial impact strength is excellent, and injection moldability is secured.

In this description, unless otherwise defined, the weight average molecular weight may be measured using gel permeation chromatography (GPC, Waters Breeze). As a specific example, the weight average molecular weight may be measured using tetrahydrofuran (THF) as an eluate through gel permeation chromatography (GPC, Waters Breeze). In this case, weight average molecular weight is obtained as a relative value to a polystyrene standard (PS) specimen. As a specific measurement example, the weight average molecular weight may be measured under conditions of solvent: THF, column temperature: 40° C., flow rate: 0.3 ml/min, sample concentration: 20 mg/ml, injection amount: 5 μl, column model: 1× PLgel 10 μm MiniMix-B (250×4.6 mm)+ 1× PLgel 10 μm MiniMix-B (250×4.6 mm)+1× PLgel 10 μm MiniMix-B Guard (50×4.6 mm), equipment name: Agilent 1200 series system, refractive index detector: Agilent G1362 RID, RI temperature: 35° C., data processing: Agilent ChemStation S/W, and test method (Mn, Mw and PDI): OECD TG 118.

The (meth)acrylic acid alkyl ester polymer (B) may be, for example, one or more selected from the group consisting of (meth)acrylic acid methyl ester, (meth)acrylic acid ethyl ester, (meth)acrylic acid propyl ester, (meth)acrylic acid 2-ethylhexylester, (meth)acrylic acid decyl ester and (meth) acrylic acid lauryl ester, preferably methyl methacrylate as a (meth)acrylic acid methyl ester.

For example, the α-methyl styrene compound may include one or more selected from the group consisting of α-methyl styrene and derivatives thereof. In this case, heat resistance may be excellent.

The derivatives of α-methyl styrene is preferably compounds in which one or more hydrogens of α-methyl styrene are substituted with a substituent such as an alkyl group having 1 to 10 carbon atoms and a halogen group, more preferably compounds in which one or more hydrogens in the aromatic ring of α-methyl styrene are substituted with a substituent such as an alkyl group having 1 to 10 carbon atoms and a halogen group.

The types of the vinyl cyanide compound included in the copolymer (B) may be the same as the types of the vinyl cyanide compound included in the graft copolymer (A-1).

The copolymer (B) may be prepared by, for example, solution polymerization, bulk polymerization, emulsion polymerization, or suspension polymerization, preferably bulk polymerization. Solution polymerization, bulk polymerization, emulsion polymerization, and suspension polymerization commonly practiced in the art to which the present invention pertains may be used in the present invention without particular limitation.

C) Polymethacrylate Resin (Except for α-Methyl Styrene)

The polymethacrylate resin (C) (except for α-methyl styrene) may be included in an amount of, for example, 6 to 30% by weight, preferably 8 to 25% by weight, more preferably 9 to 22% by weight, even more preferably 10 to % by weight. Within these ranges, deep black is excellently expressed, and a melt flow index is excellent, so that a large product can be easily injection-molded.

The polymethacrylate resin (C) (except for α-methyl styrene) includes preferably 55% by weight or more, preferably 60% by weight or more, most preferably 65% by weight or more of a methacrylate monomer. Within these ranges, deep black is excellently expressed, and a melt flow index is excellent, so that a large product can be easily injection-molded.

In this description, for example, the methacrylate monomer may be an alkyl methacrylate containing an alkyl group having 1 to 15 carbon atoms. As a specific example, the methacrylate monomer may include one or more selected from the group consisting of methyl methacrylate, ethyl methacrylate, butyl methacrylate, 2-ethylbutyl methacrylate, 2-ethylhexyl methacrylate, and lauryl methacrylate, and is preferably an alkyl methacrylate containing a chain alkyl group having 1 to 4 carbon atoms, more preferably methyl methacrylate.

The polymethacrylate resin (C) (except for α-methyl styrene) may be preferably a methyl methacrylate-styrene-acrylonitrile copolymer, or a mixture of a polymethyl methacrylate resin and a methyl methacrylate-styrene-acrylonitrile copolymer. Within these ranges, deep black is excellently expressed, and a melt flow index is excellent, so that a large product can be easily injection-molded.

For example, when a mixture of a methyl methacrylate-styrene-acrylonitrile copolymer and a polymethyl methacrylate is used as the polymethacrylate resin (C) (except for α-methyl styrene), the methyl methacrylate-styrene-acrylonitrile copolymer may be included in an amount the same as or larger than the amount of the polymethyl methacrylate resin. Preferably, the methyl methacrylate-styrene-acrylonitrile copolymer may be included in an amount larger than the amount of the polymethyl methacrylate. In this case, fluidity, multi-axial impact strength and a standard deviation of the multi-axial impact strength are excellent.

As a particular example, in 100% by weight of the thermoplastic resin composition, the methyl methacrylate-styrene-acrylonitrile copolymer may be included in an amount of 3 to 15% by weight and the polymethyl methacrylate may be included in an amount of 3 to 15% by weight. Preferably, the methyl methacrylate-styrene-acrylonitrile copolymer may be used in an amount of 5 to 12% by weight and the polymethyl methacrylate may be used in an amount of 4 to 11% by weight. In this case, heat resistance, blackness, and multi-axial impact strength and a standard deviation of the multi-axial impact strength are excellent, and a melt flow index is excellent, so that a large product can be easily injection-molded.

The methyl methacrylate-styrene-acrylonitrile copolymer may include, for example, 55 to 82% by weight of methyl methacrylate, 10 to 35% by weight of styrene, and 1 to 20% by weight of acrylonitrile, preferably 60 to 77% by weight of methyl methacrylate, 15 to 30% by weight of styrene, and 1 to 15% by weight of acrylonitrile, more preferably 67 to 72% by weight of methyl methacrylate, 20 to 25% by weight of styrene, and 5 to 10% by weight of acrylonitrile. Within these ranges, a melt flow index is improved, so that a large product can be easily injection-molded and properties are stabilized.

The weight-average molecular weight of the methyl methacrylate-styrene-acrylonitrile copolymer may be, for example, 100,000 to 180,000 g/mol, preferably 110,000 to 160,000 g/mol, more preferably 120,000 g/mol to 140,000 g/mol. Within these ranges, multi-axial impact strength is excellent, and injection moldability is secured.

The weight-average molecular weight of the polymethyl methacrylate resin may be, for example, 35,000 to 200,000 g/mol, preferably 50,000 to 200,000 g/mol, more preferably 80,000 to 150,000 g/mol. Within these ranges, multi-axial impact strength is excellent, and injection moldability is secured.

The polymethyl methacrylate resin may include, for example, methyl methacrylate and methyl acrylate. Preferably, the methyl acrylate may be included in an amount of 1 to 15% by weight, preferably 2 to 7% by weight. Within these ranges, compatibility with the methyl methacrylate-styrene-acrylonitrile copolymer is excellent, so that colorability, a melt flow index, and mechanical properties are improved.

The polymethacrylate resin (C) may be prepared by, for example, solution polymerization, bulk polymerization, emulsion polymerization, or suspension polymerization. Solution polymerization, bulk polymerization, emulsion polymerization and suspension polymerization commonly practiced in the art to which the present invention pertains may be used in the present invention without particular limitation.

The present invention includes preferably a combination of the copolymer (B) and the polymethacrylate resin (C), more preferably a combination of the copolymer (B) and the methyl methacrylate-styrene-acrylonitrile copolymer. Due to such combinations, the synergistic effect wherein mechanical properties, such as heat resistance, blackness, and impact strength, are excellent, and both multi-axial impact strength and a standard deviation thereof are excellent is expressed.

Additives

The thermoplastic resin composition may include, for example, one or more selected from the group consisting of a lubricant, a heat stabilizer, a UV stabilizer, and a slip additive. Within these ranges, the required physical properties of the thermoplastic resin composition of the present invention may be implemented without deterioration in the intrinsic physical properties thereof.

The lubricant may be included in an amount of, for example, 0.1 to 3 parts by weight, preferably 0.5 to 2 parts by weight, more preferably 0.5 to 1.5 parts by weight, based on 100 parts by weight in total of the thermoplastic resin composition. In this case, both impact strength and a melt flow index are excellent.

The lubricant may include, for example, one or more selected from the group consisting of an ester-based lubricant, a metal salt-based lubricant, a carboxylic acid-based lubricant, a hydrocarbon-based lubricant, and an amide-based lubricant, preferably an amide-based lubricant, more preferably a stearamide-based lubricant, even more preferably alkylene bis(stearamide) containing alkylene having 1 to 10 carbon atoms. In this case, the original effect of a lubricant may be well expressed without deterioration in the mechanical properties and thermal stability of a resin.

In this specification, the stearamide-based lubricant may include stearamide and a stearamide substituent in which one or more hydrogens thereof are substituted with other substituents.

Ester-based lubricants, metal salt-based lubricants, carboxylic acid-based lubricants, hydrocarbon-based lubricants, and amide-based lubricants commonly used in the art may be used in the present invention without particular limitation.

The heat stabilizer may be included in an amount of, for example, 0.1 to 2 parts by weight, preferably 0.2 to 1.5 parts by weight, based on 100 parts by weight in total of the thermoplastic resin composition. Within these ranges, heat resistance is improved.

The heat stabilizer, for example, may be one or more selected from the group consisting of a phenolic heat stabilizer, a phosphite heat stabilizer, and a thioether heat stabilizer. Preferably, the heat stabilizer is a phenolic heat stabilizer or a phosphite heat stabilizer.

The phenolic heat stabilizer, for example, may be one or more selected from the group consisting of tetrakis methylene 3-(3,5-di-tert-butyl-4-hydroxyphenyl)propionate methane, 1,3,5-tris-(4-t-butyl-3-hydroxy-2,6-dimethylbenzene)-1,3,5-triazine-2,4,6-(1H,3H,5H)-trione, and 1,3,5-tris-(3,5-di-t-butyl-4-hydroxybenzil)-s-triazine-2,4,6-(1H,3H,5H)-trione.

The phosphite heat stabilizer may be, for example, tris-nonylphenylphosphite, tris-(2,4-di-tert-butylphenyl)phosphite, bis(2,4-di-tert-butylphenyl)pentaerythritol diphosphite, or a mixture thereof.

The thioether heat stabilizer may be, for example, one or more selected from the group consisting of dilauryl thiodipropionate, dimyristyl thiodipropionate, lauryl stearyl thiodipropionate, distearyl thiodipropionate, dimethyl thiodipropionate, 2-mercaptobenzimidazole, phenothiazine, octadecyl thioglycolate, butyl thioglycolate, octyl thioglycolate, and thiocresol.

The amount of the UV stabilizer may be, for example, 0.1 to 3 parts by weight, preferably 0.5 to 1.5 parts by weight, based on 100 parts by weight in total of the thermoplastic resin composition. In this case, weather resistance is improved.

The UV stabilizer may be, for example, a hindered amine UV stabilizer (hindered amine light stabilizer, HALS). Preferably, the UV stabilizer may be one or more selected from the group consisting of one or more selected from the group consisting of 1,1-bis(2,2,6,6-tetramethyl-4-piperidyl)succinate, bis(2,2,6,6-tetramethyl-4-piperidyl)sebacate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)-N-butyl-3,5-di-tert-butyl-4-hydroxybenzilmalonate, a condensation product of 1-(2-hydroxyethyl)-2,2,6,6-tetramethyl-4-hydroxypiperidine and succinic acid, a linear or cyclic condensation product of N,N'-bis(2,2,6,6-tetramethyl-4-piperidyl)hexamethylene diamine and 4-tert-octylamino-2,6-di-chloro-1,3,5-triazine, tris(2,2,6,6-tetramethyl-4-piperidyl)nitrilotriacetate, tetrakis (2,2,6,6-tetramethyl-4-piperidyl)-1,2,3,4-butane tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, a linear or cyclic condensation product of N,N'-bis(2,2,6,6-tetramethyl-4-piperidyl)hexamethylene diamine and 4-morpholino-2,6-dichloro-1,3,5-triazine, a reaction product of 7,7,9,9-tetramethyl-2-cycloundecyl-1-oxa-3,8-diaza-4-oxospiro-[4,5]decane and epichlorohydrin, and poly[[6-(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino].

The UV stabilizer may be more preferably bis(2,2,6,6-tetramethyl-4-piperidyl)sebacate, 2-(2H-benzotriazol-2-yl)-4-(-(1,1,3,3-tetramethylbutyl)phenol, poly[[6-(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino], or a mixture thereof, even more preferably bis(2,2,6,6-tetramethyl-4-piperidyl)sebacate(Bis(2,2,6,6-tetramethyl-4-piperidyl), poly[[6-(1,1,3,3-tetramethylbutyl)amino]-1,3,5-triazine-2,4-diyl][(2,2,6,6-tetramethyl-4-piperidinyl)imino]-1,6-hexandiyl[(2,2,6,6-tetramethyl-4-piperidinyl)imino], or a mixture thereof. In this case, weather resistance is greatly improved without compromising impact strength and fluidity.

The amount of the slip additive may be, for example, 0.1 to 3 parts by weight, preferably 0.5 to 2 parts by weight, based on 100 parts by weight in total of the thermoplastic resin composition. Within these ranges, friction resistance is improved.

In this disclosure, a lubricant is used to improve moldability (processability) upon injection molding, and a slip additive is used to improve surface properties of a completed product which has been subjected to injection molding.

The slip additive may be, for example, a polyester-modified siloxane. In this case, compatibility with a thermoplastic resin composition is excellent.

In particular, a main chain of the polyester-modified siloxane may be polydimethylsiloxane and an organic group of the polydimethylsiloxane may be substituted with polyester, so that polydimethylsiloxane is included as a main chain and polyester is included as a side chain. In this case, compatibility with a thermoplastic resin composition is further improved, so that friction resistance is further improved while highly maintaining the property balance of a composition.

The polyester-modified siloxane may be a polyester-modified siloxane at a terminal of which a hydroxyl group is present. In this case, compatibility with a thermoplastic resin composition is further improved so that friction resistance can be greatly improved while highly maintaining overall property balance.

The melting point of the polyester-modified siloxane may be, for example, 50 to 55° C., preferably 52 to 55° C., Within these ranges, compounding with the thermoplastic resin composition can be easily performed.

In this disclosure, the melting point may be measured using Differential Scanning Calorimeter (DSC) 2920 manufactured by TA Instruments Co. As a particular measurement example, the melting point may be measured by a method of equilibrating DSC at 0° C., and then increasing by 20° C. per minute to elevate up to 180° C., and then decreasing by 20° C. per minute to lower up to −60° C., and then increasing by 10° C. per minute to elevate up to 180° C. Here, the melting point is obtained by taking a top region of an endothermic curve during the second temperature rises.

The polyester-modified siloxane may have a pellet shape. In this case, compounding with a thermoplastic resin composition can be easily performed, resulting in productivity increase.

Based on 100 parts by weight of the thermoplastic resin composition, the thermoplastic resin composition may selectively include one or more selected from the group consisting of a dye, a pigment, a flame retardant, and an inorganic filler in an amount of 0.01 to 5 parts by weight, preferably 0.05 to 3 parts by weight, more preferably 0.1 to 2 parts by weight, even more preferably 0.5 to 1 parts by weight, as needed. Within these ranges, the required physical properties of the thermoplastic resin composition of the present invention may be implemented without deterioration in the intrinsic physical properties thereof.

Thermoplastic Resin Composition

An average multi-axial impact strength, which is obtained by measuring a maximum load energy 10 times at a speed of 4.4 m/s according to ISO 6603-2, of the thermoplastic resin composition of the present invention may be preferably 22 J or more, more preferably 23 J or more, even more preferably 23 to 27 J, even more preferably 24 to 27 J. Here, a standard deviation of the average multi-axial impact strength may be preferably 6.5 or less, more preferably 6 or less, even more preferably 5 or less, even more preferably 3 to 5. Within these ranges, major reliability evaluation required for automotive exterior materials is satisfied.

In addition, Charpy impact strength (23° C.), which is measured using a notched specimen according to ISO 179, of the thermoplastic resin composition may be preferably 9 kJ/m2 or more, more preferably 10 kJ/m2 to 17 kJ/m2, even more preferably 12 to 15 kJ/m2. Within these ranges, property balance is excellent, and impact strength required for a large injection-molded article is satisfied.

In addition, the melt flow index, which is measured under 10 kg at 220° C. according to ISO 1133, of the thermoplastic resin composition may be preferably 5.5 g/10 min or more, more preferably 6 to 10 g/10 min, even more preferably 6 to 9 g/10 min. Within these ranges, flowability is excellent, so that a large product can be easily injection-molded.

The heat distortion temperature, which is measured at 1.8 MPa according to ISO 75/Be, of the thermoplastic resin composition may be preferably 77° C. or more, more preferably 78 to 85° C., even more preferably 80 to 85° C. Within these ranges, overall property balance is excellent.

Based on 100 parts by weight of the thermoplastic resin composition, the thermoplastic resin composition preferably includes 3 parts by weight of BK56 (manufactured by Muilchemical) and 0.5 parts by weight of BK57 (manufactured by Muilchemical), as carbon black pigments. A specimen having a size of 100×100×3 mm is manufactured at an injection-molding temperature of 240° C. and a molding temperature of 60° C. The blackness (L; pigment), which is measured in the SCI mode using a colormeter, of the specimen may be 26.5 or less, more preferably 20 to 26.5, even more preferably 22 to 26.2. Within these ranges, overall property balance is excellent, and deep black can be realized.

Based on 100 parts by weight of the thermoplastic resin composition, the thermoplastic resin composition preferably includes 0.6 parts by weight of BK39 (manufactured by Muilchemical), as a dye. A specimen having a size of 100×100×3 mm is manufactured at an injection-molding temperature of 240° C. and a molding temperature of 60° C. The blackness(L; dye), which is measured in the SCI mode using a colormeter, of the specimen may be 26 or less, preferably 20 to 26, even more preferably 23 to 26. Within these ranges, overall property balance is excellent, and deep black can be realized.

The tensile strength, which is measured according to ISO 527, of the thermoplastic resin composition may be preferably 44 MPa or more, more preferably 45 MPa or more, even more preferably 45 to 55 MPa,. Within these ranges, overall property balance is excellent.

For example, when a surface of a specimen injection-molded from the thermoplastic resin composition is visually observed, goniochromism is not be observed. In this case, excellent surface quality is provided.

Hereinafter, a method of preparing the thermoplastic resin composition of the present invention, and a molded article including the thermoplastic resin composition are described. In describing the method of preparing the thermoplastic resin composition of the present invention and the molded article including the thermoplastic resin composition, all contents regarding the above-described thermoplastic resin composition are included.

Thermoplastic Resin Composition Preparation Method

A method of preparing a thermoplastic resin composition of the present disclosure includes a step of mixing 3 to 22% by weight of a graft copolymer (A-1) including an acrylate-based rubber having an average particle diameter of 200 to 400 nm, an aromatic vinyl compound, and a vinyl cyanide compound, 17 to 40% by weight of a graft copolymer (A-2) including an acrylate-based rubber having an average particle diameter of 50 to 199 nm, an aromatic vinyl compound, and a vinyl cyanide compound, 30 to 57% by weight of a copolymer (B) including a (meth)acrylic acid alkyl ester compound, an α-methyl styrene-based compound, and a vinyl cyanide compound and 6 to 30% by weight of a polymethacrylate resin (C) (except for α-methyl styrene), and then preparing a thermoplastic resin composition at 200 to 300° C. using an extrusion kneader with a size of 10 to 100 pi, wherein an average multi-axial impact strength, which is obtained by measuring a maximum, load energy 10 times at a speed of 4.4 m/s according to ISO 6603-2, of the thermoplastic resin composition is 22 J/mm or more, and a standard deviation of the average multi-axial impact strength is 6.5 or less. In this case, impact resistance, heat resistance, and fluidity are excellent, so that a large product can be injection-molded. In addition, the occurrence of goniochromism can be suppressed while realizing deep black, so that the appearance quality of an injection-molded product, and automobile reliability evaluation are satisfied.

The kneading and the extrusion may be performed, for example, using a single-screw extruder, a twin-screw extruder, or a Banbury mixer. In this case, a composition is uniformly dispersed, so that excellent compatibility is provided.

The kneading and the extrusion may be performed at a barrel temperature of, for example, 200 to 300° C., preferably 210 to 280° C., more preferably 220 to 250° C. In this case, a throughput per unit time is appropriate, melt-kneading may be sufficiently performed, and problems, such as thermal decomposition of resin components, can may be prevented.

The kneading and the extrusion may be performed, for example, under a condition of a screw rotation number of 100 to 500 rpm, 150 to 400 rpm, 100 to 350 rpm, or 200 to 310 rpm, preferably 250 to 350 rpm. In this case, a throughput per unit time is appropriate, so that process efficiency is excellent and excessive cutting can be prevented.

Molded Article

A molded article of the present disclosure, for example, may include the thermoplastic resin composition of the present disclosure. In this case, impact resistance, heat resistance, and fluidity are excellent, so that a large product can be injection-molded, and the occurrence of goniochromism can be suppressed while realizing deep black can be realized. Accordingly, the appearance quality of an injection-molded product and automobile reliability evaluation are satisfied.

The molded article may be, for example, an automobile exterior material, specifically a large injection-molded article such as a radiator grill. Accordingly, the thermoplastic resin composition of the present disclosure can provide products having quality or higher quality required by the market.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLE (A-1) ASA graft copolymer: 40% by weight of butyl acrylate rubber having an average particle diameter of 300 nm, 43.8% by weight of styrene, and 16.2% by weight of acrylonitrile (A-2) ASA graft copolymer: 50% by weight of butyl acrylate rubber having an average particle diameter of 130 nm, 36.5% by weight of styrene, and 13.5% by weight of acrylonitrile (A-3) ASA graft copolymer: 50% by weight of butyl acrylate rubber having an average particle diameter of 450 nm, 36.5% by weight of styrene, and 13.5% by weight of acrylonitrile (B-1) MMA-based heat-resistant SAN resin prepared by bulk polymerization method: 45% by weight of methyl methacrylate, 36% by weight of α-methyl styrene, and 19% by weight of acrylonitrile (B-2) Heat-resistant SAN resin prepared by bulk polymerization method: 72% by weight of α-methyl styrene, and 28% by weight of acrylonitrile (B-3) PMI heat-resistant resin prepared by bulk polymerization method: MSNJ manufactured by Denka (C-1) MMA-SAN resin: 71% by weight of methacrylate, 22% by weight of styrene, and 7% by weight of acrylonitrile (C-2) PMMA resin prepared by suspension polymerization method: polymethyl methacrylate resin (weight-average molecular weight: 101,000 g/mol)

(D) Lubricant: ethylene bis stearamide (EBA, manufactured by SUNKOO)

(E-1) Heat stabilizer: IR1076 (manufactured by BASF)

(E-2) Heat stabilizer: IF168 (manufactured by BASF)

(F-1) UV stabilizer: Tin-700 (manufactured by BASF)

(F-2) UV stabilizer: Chimassorb-944 (manufactured by GLOBAL PLANNING CO., LTD)

(G) Slip additive: H-Si 6441P (manufactured by EVONIK)

Examples 1 to 6 and Comparative Examples 1 to 11

Pellets were manufactured by performing kneading and extrusion in an extruder (SM Twin screw extruder, 250) at an extrusion temperature of 240° C., a feed rate of 20 kg/hr, and a screw speed of 300 rpm according to the components and contents as summarized in Tables 1 to 3 below. The melt index of each of the manufactured pellets were measured. The manufactured pellets were used to produce injection-mold specimens using an injection machine (ENGEL 120MT) under conditions of an injection-molding temperature of 240° C., a molding temperature of 60° C., and an injection rate of 30 mm/min.

Test Example

The properties of the pellets and injection-molded specimens manufactured according to Examples 1 to 6 and Comparative Examples 1 to 11 were measured according to the following methods. Results are summarized in Tables 1 to 3 below.

Charpy impact strength (kJ/m2): Measured at 23° C. according to ISO 179/1eA using a notched specimen (thickness: 4 mm).

Melt flow index (MFR; g/10 min): Measured under conditions of 220° C. and 10 kg according to ISO 333 using the manufactured pellet.

Tensile strength (MPa): Measured according to ISO 527.

Heat deflection temperature (HDT; ° C.): Measured under 1.8 MPa according to ISO 75/Be.

Average multi-axial impact strength (multi-axial impact strength; J) and standard deviation of multi-axial impact strength: Maximum load energy was measured 10 times at a speed of 4.4 m/s according to ISO 6603-2 using a specimen having a thickness of 2.0 mm to find an average value and standard deviation value thereof.

Blackness (L): Measured in an SCI mode by means of a colormeter using an injection-molded pigment specimen and dye specimen having a size of 100×100×3 mm.

As a blackness (L) value is small, deep black is well expressed.

Based on 100 parts by weight of the thermoplastic resin composition, 3 parts by weight of BK56 (manufactured by Muilchemical) and 0.5 parts by weight of BK57 (manufactured by Muilchemical), as carbon black pigments, were kneaded and extruded to manufacture a pellet. Next, the pellet was injection-molded at an injection-molding temperature of 240° C. and a molding temperature of 60° C. to manufacture a pigment specimen having a size of 100×100×3 mm.

Based on based on 100 parts by weight of the thermoplastic resin composition, 0.6 parts by weight of BK39 (manufactured by Muilchemical), as a dye, were kneaded and extruded to manufacture a pellet. The pellet was injection-molded at an injection-molding temperature of 240° C. and a molding temperature of 60° C. to manufacture a dye specimen having a size of 100×100×3 mm.

Goniochromism: NP color and the colors of an extruded pigment and dye pellet and injection-molded specimens were visually observed to confirm whether a rainbow or pearlescent color was generated. When any one, i.e., goniochromism, thereamong was generated, it was indicated as "occurrence." On the other hand, when there was no color generation, it was indicated as "Non-occurrence."

Here, the NP color refers to the unique color of a resin that is not colored, meaning that no pigment or dye is applied.

TABLE 1

|  | Example 1 | Example 2 | Example 3 | Example 4 | Example 5 | Example 6 |
|---|---|---|---|---|---|---|
| (A-1) | 10 | 11 | 8 | 5 | 10 | 20 |
| (A-2) | 28 | 27 | 28 | 35 | 28 | 20 |
| (A-3) |  |  |  |  |  |  |
| (B-1) | 47 | 47 | 54 | 50 | 42 | 50 |
| (B-2) |  |  |  |  |  |  |
| (B-3) |  |  |  |  |  |  |
| (C-1) | 15 | 11 | 5 | 10 | 10 | 10 |
| (C-2) |  | 4 | 5 |  | 10 |  |
| (D) EBA | 1.0 | 1.0 | 1.0 | 1.0 | 1.0 | 1.0 |
| (E-1) IR1076 | 0.2 | 0.2 | 0.2 | 0.2 | 0.2 | 0.2 |
| (E-2) IF168 | 0.2 | 0.2 | 0.2 | 0.2 | 0.2 | 0.2 |

TABLE 1-continued

|  | Example 1 | Example 2 | Example 3 | Example 4 | Example 5 | Example 6 |
|---|---|---|---|---|---|---|
| (F-1) Tin-700 | 0.3 | 0.3 | 0.3 | 0.3 | 0.3 | 0.3 |
| (F-2) Chimasorb-944 | 0.7 | 0.7 | 0.7 | 0.7 | 0.7 | 0.7 |
| (G) H—Si 6441P | 1.0 | 1.0 | 1.0 | 1.0 | 1.0 | 1.0 |
| Property | | | | | | |
| Charpy impact strength | 12 | 12 | 10 | 10 | 9 | 15 |
| MFR | 9 | 8 | 8 | 7 | 7 | 6 |
| Tensile strength | 48 | 47 | 49 | 45 | 47 | 44 |
| HDT | 82 | 82 | 83 | 80 | 81 | 78 |
| Blackness (pigment) | 26.0 | 26.0 | 26 | 26.1 | 26 | 26.4 |
| Blackness (dye) | 25.7 | 25.7 | 25.8 | 25.9 | 25.7 | 26 |
| Average multi-axial impact strength | 25 | 25 | 25 | 25 | 23 | 25 |
| Standard deviation of multi-axial impact strength | 5 | 5 | 6 | 4 | 6 | 4 |
| Goniochromism | Non-occurrence | Non-occurrence | Non-occurrence | Non-occurrence | Non-occurrence | Non-occurrence |

TABLE 2

|  | Comparative Example 1 | Comparative Example 2 | Comparative Example 3 | Comparative Example 4 | Comparative Example 5 |
|---|---|---|---|---|---|
| (A-1) |  |  |  |  | 10 |
| (A-2) | 30.0 | 30.0 | 35.0 | 30.0 | 28 |
| (A-3) | 5.0 | 5.0 |  | 5.0 |  |
| (B-1) |  | 15.0 | 50.0 | 50.0 |  |
| (B-2) | 30.0 |  |  |  |  |
| (B-3) |  | 15.0 |  |  |  |
| (C-1) | 15.0 | 15.0 | 11.0 | 11.0 |  |
| (C-2) | 20.0 | 20.0 | 4.0 | 4.0 | 62 |
| (D) EBA | 1.0 | 1.0 | 1.0 | 1.0 | 1.0 |
| (E-1) IR1076 | 0.2 | 0.2 | 0.2 | 0.2 | 0.2 |
| (E-2) IF168 | 0.2 | 0.2 | 0.2 | 0.2 | 0.2 |
| (F-1) Tin-700 | 0.3 | 0.3 | 0.3 | 0.3 | 0.3 |
| (F-2) Chimasorb-944 | 0.7 | 0.7 | 0.7 | 0.7 | 0.7 |
| (G) H-Si 6441P | 1.0 | 1.0 | 1.0 | 1.0 | 1.0 |
| Property | | | | | |
| Charpy impact strength | 10 | 7 | 5 | 10 | 10 |
| MFR | 8 | 3 | 9 | 9 | 4 |
| Tensile strength | 48 | 48 | 49 | 48 | 47 |
| HDT | 83 | 85 | 82 | 83 | 75 |
| Blackness (pigment) | 26.1 | 26.0 | 25.8 | 26.0 | 25.6 |
| Blackness (dye) | 26.9 | 26.3 | 25.5 | 25.7 | 24.8 |
| Average multi-axial impact strength | 20 | 11 | 18 | 21 | 10 |

TABLE 2-continued

|  | Comparative Example 1 | Comparative Example 2 | Comparative Example 3 | Comparative Example 4 | Comparative Example 5 |
|---|---|---|---|---|---|
| Standard deviation of multi-axial impact strength | 14 | 7 | 7 | 7 | 7 |
| Goniochromism | Occurrence | Occurrence | Non-occurrence | Non-occurrence | Non-occurrence |

TABLE 3

|  | Comparative Example 6 | Comparative Example 7 | Comparative Example 8 | Comparative Example 9 | Comparative Example 10 | Comparative Example 11 |
|---|---|---|---|---|---|---|
| (A-1) | 10 | 25 | 8 | 9 | 10 | 10 |
| (A-2) | 28 | 10 | 20 | 25 | 28 | 28 |
| (A-3) |  |  |  |  |  |  |
| (B-1) | 22 | 50 | 64 | 10 |  | 39 |
| (B-2) |  |  |  |  | 47 |  |
| (B-3) |  |  |  |  |  |  |
| (C-1) |  |  | 2 |  | 11 |  |
| (C-2) | 40 | 4 | 6 | 56 | 4 | 23 |
| (D) EBA | 1.0 | 1.0 | 1.0 | 1.0 | 1.0 | 1.0 |
| (E-1) IR1076 | 0.2 | 0.2 | 0.2 | 0.2 | 0.2 | 0.2 |
| (E-2) IF168 | 0.2 | 0.2 | 0.2 | 0.2 | 0.2 | 0.2 |
| (F-1) Tin-700 | 0.3 | 0.3 | 0.3 | 0.3 | 0.3 | 0.3 |
| (F-2) Chimasorb-944 | 0.7 | 0.7 | 0.7 | 0.7 | 0.7 | 0.7 |
| (G) H—Si 6441P | 1.0 | 1.0 | 1.0 | 1.0 | 1.0 | 1.0 |
| Property |  |  |  |  |  |  |
| Charpy impact strength | 9 | 13 | 7 | 8 | 13 | 10 |
| MFR | 4 | 8 | 12 | 5 | 9 | 6 |
| Tensile strength | 47 | 44 | 53 | 48 | 48 | 47 |
| HDT | 78 | 79 | 86 | 77 | 84 | 81 |
| Blackness (pigment) | 25.6 | 26.8 | 25.9 | 25.6 | 26.5 | 25.8 |
| Blackness (dye) | 24.9 | 26.6 | 25.6 | 24.8 | 27 | 25.1 |
| Average multi-axial impact strength | 16 | 20 | 16 | 13 | 23 | 20 |
| Standard deviation of multi-axial impact strength | 8 | 8 | 10 | 9 | 12 | 8 |
| Goniochromism | Non-occurrence | Non-occurrence | Non-occurrence | Non-occurrence | Occurrence | Non-occurrence |

As shown in Tables 1 to 3, it was confirmed that the thermoplastic resin compositions (Examples 1 to 6) according to the present invention exhibited excellent fluidity, heat resistance, and multi-axial impact strength and excellent standard deviation of the multi-axial impact strength and realized deep black without occurrence of goniochromism, compared to Comparative Examples 1 to 11. It was confirmed that in the case of all of Comparative Examples 1 to 11, an average multi-axial impact strength was less than 22 J, and a standard deviation exceeded 6.5, which does not satisfy automobile reliability evaluation. Accordingly, it was confirmed that the compositions according to Comparative Examples 1 to 11 were insufficient for automobile applications. In particular, in the case of Comparative Examples 1, 2 and 10 excluding the copolymer (B-1) or including the same in a small amount, goniochromism occurred. Specifically, in the case of Comparative Example 1 and 10, a standard deviation of multi-axial impact strength was greatly increased.

In addition, in the case of Comparative Example 3 only including the ASA resin having an average particle diameter of 130 nm, Charpy impact strength was poor, and in the case of Comparative Examples 5 to 7 and 9 excluding the combination of the copolymer(B-1) and the copolymer (C-1), heat resistance was decreased.

Further, in the case of Comparative Example 11 only including the PMMA resin (C-2), multi-axial impact strength was decreased, and the standard deviation of the multi-axial impact strength increased.

The invention claimed is:
1. A thermoplastic resin composition, comprising:
3 to 22% by weight of a graft copolymer (A-1) comprising
a first acrylate-based rubber having an average particle diameter of 200 to 400 nm,
a first aromatic vinyl compound, and
a first vinyl cyanide compound;

17 to 40% by weight of a graft copolymer (A-2) comprising
a second acrylate-based rubber having an average particle diameter of 50 to 199 nm,
a second aromatic vinyl compound, and
a second vinyl cyanide compound;
30 to 57% by weight of a copolymer (B) comprising
a (meth)acrylic acid alkyl ester compound,
an α-methyl styrene-based compound, and
a third vinyl cyanide compound; and
6 to 30% by weight of a polymethacrylate resin (C) except for α-methyl styrene,
wherein an average multi-axial impact strength, which is obtained by measuring a maximum load energy 10 times at a speed of 4.4 m/s according to ISO 6603-2, of a specimen having a thickness of 2.0 mm is 22 J/mm or more, and a standard deviation thereof is 6.5 or less.

2. The thermoplastic resin composition according to claim 1, wherein the graft copolymer (A-1) comprises 30 to 50% by weight of the first acrylate rubber, 30 to 60% by weight of the first aromatic vinyl compound, and 5 to 20% by weight of the first vinyl cyanide compound.

3. The thermoplastic resin composition according to claim 1, wherein the graft copolymer (A-2) comprises 30 to 60% by weight of the second acrylate rubber, 20 to 60% by weight of the second aromatic vinyl compound, and 5 to 20% by weight of the second vinyl cyanide compound.

4. The thermoplastic resin composition according to claim 1, wherein the graft copolymer (A-1) is present in a smaller amount than an amount of the graft copolymer (A-2).

5. The thermoplastic resin composition according to claim 1, wherein the copolymer (B) comprises 30 to 55% by weight of the (meth)acrylic acid alkyl ester compound, 25 to 50% by weight of the α-methyl styrene-based compound, and 10 to 30% by weight of the third vinyl cyanide compound.

6. The thermoplastic resin composition according to claim 1, wherein the copolymer (B) has a weight-average molecular weight of 50,000 to 200,000 g/mol.

7. The thermoplastic resin composition according to claim 1, wherein the polymethacrylate resin (C) except for α-methyl styrene comprises 55% by weight or more of a methacrylate monomer.

8. The thermoplastic resin composition according to claim 7, wherein the polymethacrylate resin (C) except for α-methyl styrene includes a methyl methacrylate-styrene-acrylonitrile copolymer, or a mixture including the methyl methacrylate-styrene-acrylonitrile copolymer and a polymethyl methacrylate resin.

9. The thermoplastic resin composition according to claim 8, wherein the methyl methacrylate-styrene-acrylonitrile copolymer comprises 55 to 82% by weight of methyl methacrylate, 10 to 35% by weight of styrene, and 1 to 20% by weight of acrylonitrile.

10. The thermoplastic resin composition according to claim 1, further comprising one or more selected from the group consisting of a lubricant, a heat stabilizer, a UV stabilizer, and a slip additive.

11. The thermoplastic resin composition according to claim 1, wherein a Charpy impact strength (23° C.), which is measured using a notched specimen according to ISO 179, of the thermoplastic resin composition is 9 kJ/m$^2$ or more.

12. The thermoplastic resin composition according to claim 1, wherein a melt flow index, which is measured at 220° C. under 10 kg according to ISO 1133, of the thermoplastic resin composition is 5 g/10 min or more.

13. A method of preparing a thermoplastic resin composition, the method comprising:
mixing 3 to 22% by weight of a graft copolymer (A-1) comprising a first acrylate-based rubber having an average particle diameter of 200 to 400 nm, a first aromatic vinyl compound, and a first vinyl cyanide compound, 17 to 40% by weight of a graft copolymer (A-2) comprising a second acrylate-based rubber having an average particle diameter of 50 to 199 nm, a second aromatic vinyl compound, and a second vinyl cyanide compound, 30 to 57% by weight of a copolymer (B) comprising a (meth)acrylic acid alkyl ester compound, an α-methyl styrene-based compound, and a third vinyl cyanide compound, and 6 to 30% by weight of a polymethacrylate resin (C) except for α-methyl styrene, and then preparing the thermoplastic resin composition at 200 to 300° C. using an extrusion kneader with a size of 10 to 100 pi,
wherein an average multi-axial impact strength, which is obtained by measuring a maximum load energy 10 times using a specimen having a thickness of 2.0 mm at a speed of 4.4 m/s according to ISO 6603-2, of the prepared thermoplastic resin composition is 22 J/mm or more, and a standard deviation of the average multi-axial impact strength is 6.5 or less.

14. A molded article, comprising the thermoplastic resin composition according to claim 1.

* * * * *